United States Patent
Sedaka

(10) Patent No.: US 6,491,852 B1
(45) Date of Patent: Dec. 10, 2002

(54) METHOD OF MAKING MONOLITHIC TERRAZZO FLOORS HAVING SEAMLESSLY INTEGRATED INLAYS

(75) Inventor: Allen Sedaka, Great Neck, NY (US)

(73) Assignee: Durite Concepts Inc., Great Neck, NY (US)

( * ) Notice: Subject to any disclaimer, the term of this patent is extended or adjusted under 35 U.S.C. 154(b) by 0 days.

(21) Appl. No.: 09/557,075

(22) Filed: Apr. 20, 2000

Related U.S. Application Data

(60) Provisional application No. 60/130,198, filed on Apr. 20, 1999.

(51) Int. Cl.[7] ............ E04F 15/12; E04B 5/16; E04B 5/17; E04B 5/44
(52) U.S. Cl. ............ 264/35; 264/73; 264/139; 264/162; 264/247; 264/261; 264/275; 264/279; 428/48; 428/49; 428/67; 156/154; 52/318; 52/745.05
(58) Field of Search ............ 264/35, 73, 139, 264/162, 247, 261, 279, 275; 156/154; 428/48, 49, 67; 52/318, 745.05

(56) References Cited

U.S. PATENT DOCUMENTS

| | | | |
|---|---|---|---|
| 850,538 A | * | 4/1907 | Newman |
| 1,137,595 A | * | 4/1915 | Eyl |
| 1,689,164 A | * | 10/1928 | Sylvester ............ 404/17 |
| 2,185,492 A | * | 1/1940 | Barrett |
| 2,491,488 A | * | 12/1949 | Faulwetter ............ 404/18 |
| 2,651,079 A | * | 9/1953 | Michaelson et al. |
| 3,344,011 A | * | 9/1967 | Goozner |
| 3,589,087 A | * | 6/1971 | De Lazzero ............ 52/181 |
| 3,700,533 A | * | 10/1972 | Schmitz |
| 3,906,692 A | * | 9/1975 | Boiardi ............ 52/100 |
| 4,036,929 A | * | 7/1977 | Gould ............ 264/132 |
| 4,486,371 A | * | 12/1984 | Caliri ............ 264/78 |
| 4,624,815 A | * | 11/1986 | Moufarrege ............ 264/162 |
| 5,185,192 A | * | 2/1993 | Banus ............ 428/49 |
| 5,609,804 A | * | 3/1997 | Alieri ............ 264/56 |
| 5,904,886 A | * | 5/1999 | Stecker ............ 264/139 |

FOREIGN PATENT DOCUMENTS

| | | | | |
|---|---|---|---|---|
| GB | 2239665 A | * | 7/1991 | ............ E01C/5/22 |
| GB | 2268521 A | * | 1/1994 | ............ E04F/15/10 |

* cited by examiner

*Primary Examiner*—Jan H. Silbaugh
*Assistant Examiner*—Michael I. Poe
(74) *Attorney, Agent, or Firm*—Cohen, Pontani, Lieberman & Pavane

(57) ABSTRACT

A method of making terrazzo floors with design inlays. The method utilizes pre-molded inserts as inlays in the finished floor, and generally includes four steps. First, inserts are pre-molded, which has design elements in terms of their color, nature of inclusions (chips, glass fragments, etc. and their colors), shape and/or a pattern of grooves in their upper surfaces. Second, the pre-molded inserts are placed on and affixed to the sub-flooring in a predetermined arrangement. Third, epoxy flooring mixture is poured to a height that fills the grooves in the inserts' upper surfaces and preferably cover the inserts. Fourth, the floor, after cured and hardened, is ground and polished to expose the upper surfaces of the inserts, which now become seamlessly integrated inlays within the overall finished floor. The designs in the inlays are viewable because the inserts contain different visual ingredients (pigments, colored plastic or glass chips, etc) in contrast with the overall floor and they are outlined by the filled grooves.

7 Claims, 4 Drawing Sheets

METHOD OF MAKING MONOLITHIC TERRAZZO FLOORS HAVING SEAMLESSLY INTEGRATED INLAYS

RELATED APPLICATIONS

This application claims priority from U.S. Provisional Patent Application Serial Number 60/130,198 which was filed on Apr. 20, 1999.

BACKGROUND OF THE INVENTION

1. Field of the Invention

The present invention relates to a wall or floor covering and a method for producing the same. Particularly, the invention pertains to a terrazzo floor with design inlays therein which, compared to prior art inlay floors, can be made more efficiently and less expensively.

2. Description of the Related Art

In the field of construction and architecture, terrazzo refers to a flooring which consists of small aggregates of marble or granite set in cement. Terrazzo floors have been used for many years. The basic principle and methods of producing such floors are well established in the art. In recent times, formulas for terrazzo floors utilizing synthetic materials such as epoxy or other resins, have become popular because they generally produce floors with better durability and appearance than traditional cementities terrazzo floors. However, terrazzo floors are well-known in the art to be labor intensive, time consuming and expensive to manufacture, and it is even more so for fabricating terrazzo floors with design inlays. Therefore, people generally forgo fabricating inlays in a terrazzo floor and content with its monotonous appearance.

The only prior way known to the applicant to fabricate inlays in a terrazzo floor is through the use of metal strips. According to this method, metal strips are embedded in a screed bed, known as a "lean" layer (containing no aggregates and less water) between the substrate foundation layer and the finished floor. These metal strips are so arranged that they define an isolated area with a predetermined shape. After the metal strips are put in place, a terrazzo fluid mixture of a selected decorative characteristic is poured into those areas defined by the metal strips. After the poured mixture sets, a terrazzo flooring fluid of a second decorative characteristic is poured into the space between those isolated and now set areas to form the overall floor. An inlay floor is thus formed.

The above method of making inlay floors has several drawbacks. First, it is extremely labor intensive. Each inlay area must be individually isolated with metal strips, and care must be exercised to ascertain that the shapes of the isolated areas are consistent with each other. In addition, the floor must be poured twice, first for the inlay areas and then for the overall floor. Second, it is not suitable for embedding inlays with detailed and complex design patterns. Such inlay patterns would necessarily require the use of metal stripes to define dozens of isolated tiny areas, which is not feasible if not impossible. Third, the inlays and the overall floor are not seamlessly integrated and always have metal strips in between. The presence of metal strips is oftentimes artistically undesirable and brings about extra costs.

The above drawbacks have dampened customers' desire to have design inlays within their terrazzo floors. Accordingly, there exists a need for a new method to manufacture terrazzo floors with design inlays. The present invention is directed to this end, and provides an efficient method of producing terrazzo floors that contain seamlessly integrated inlays with complex design patterns.

SUMMARY OF THE INVENTION

In accordance with the present invention, a terrazzo floor with design inlays can be efficiently produced through the use of pre-molded inserts. The floor produced according to the present invention, unlike a conventional inlaid terrazzo floor, requires no metal strips as the interface between the inlays and the overall floor. In fact, the floor made according to this invention is seamless between the overall floor and the inlay because bonds are formed between the inlays and the overall floor, which are both made of same or similar resinous material. Therefore, by obviating the use of metal strips, the present invention provides an easy, fast, and inexpensive method of making monolithic terrazzo floors with an unlimited variety of design inlays therein. Furthermore, because inserts can be pre-made in a centralized facility or factory, this invention further minimizes the costs associated with the setups at the working place for each and every individual customer.

The method of the present invention generally comprises four steps. The first step is preparing inserts. An insert is made by pouring a terrazzo flooring mixture containing particular visual ingredients (pigments and/or colored plastic or glass chips, etc) into a mold. The molding cavity of the mold is designed so that the molded insert generally has parallel upper and lower surfaces, with the upper surface preferably containing one or more molded grooves. The insert is also molded with a design element. The design element may be embodied as the shape designed for the upper surface of the insert or in an artistic pattern defined by the grooves in the upper surface of the insert. The second step is placing the pre-molded inserts on the floor substrate (or sub-flooring) and affixing them thereto. The inserts are positioned in such a way that the upper surfaces of the inserts will become part of the finished floor surface. The third step is pouring the floor with a terrazzo flooring mixture. The flooring mixture for the overall floor maybe conventionally formulated from a resinous material and visual ingredients, one of which at least is different from those in the inserts. The floor is poured to a height that slightly covers the inserts and preferably also fills the grooves in the upper surface of the inserts. The fourth step is the polishing step. After the floor is set and hardened, the entire surface of the floor is ground and polished to expose the inserts' upper surfaces which are now part of the overall floor without removing the overall material filling the groove inserts. In this way, the inserts become seamlessly integrated inlays showing predetermined design patterns in contrast with the overall floor.

Thus, one of the objectives of the present invention is to provide relatively inexpensive terrazzo floors or other surfaces which have embedded artistic inlays.

Other objects and features of the present invention will become apparent from the following detailed description considered in conjunction with the accompanying drawings. For example, the same method disclosed herein may be used to make individual inlaid tiles, which can then be used to cover floors, walls or other surfaces. It is to be understood, therefore, that the description and drawings are provided solely for purposes of illustration and not as a definition of the limits of the invention, for which reference should be made to the claims.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, like reference characters denote similar elements throughout the several views.

DETAILED DESCRIPTION OF THE PRESENTLY PREFERRED EMBODIMENTS

Figure 1:
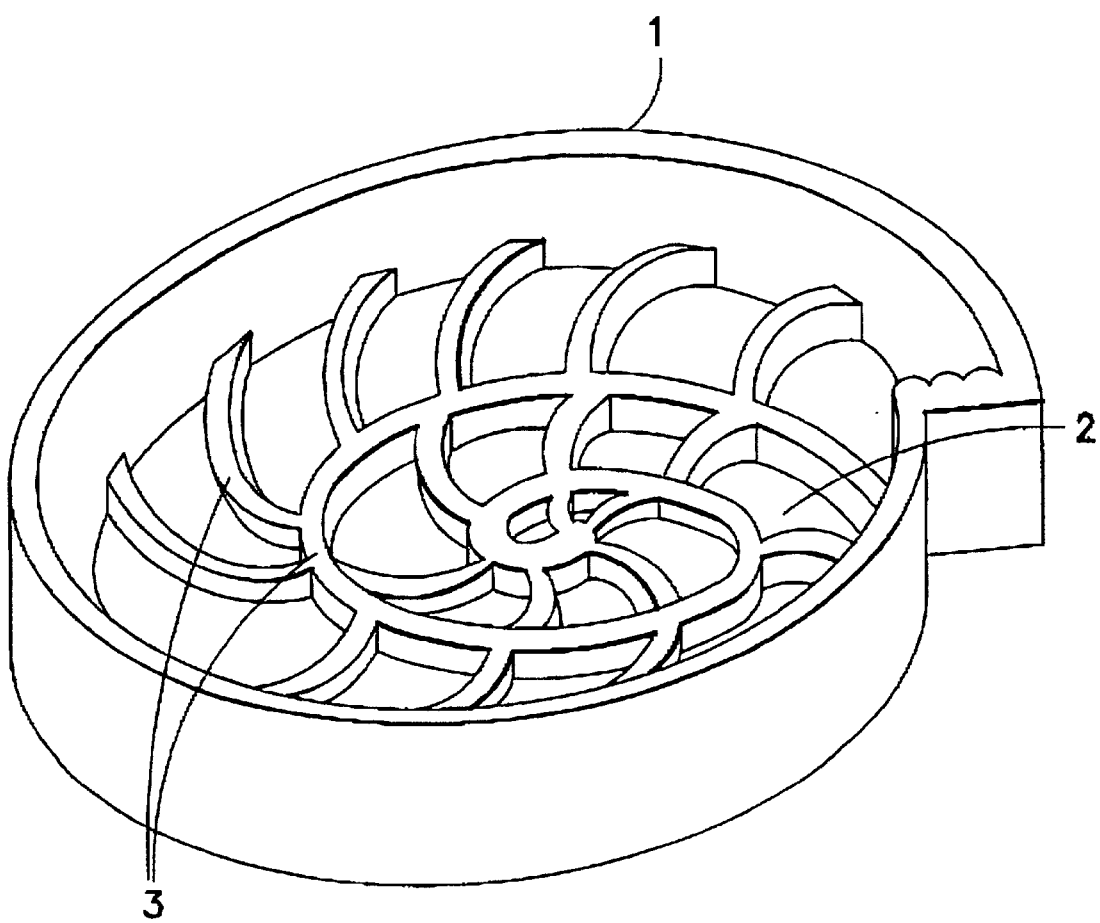
FIG. 1 is a perspective view of an exemplary mold which is used to mold inserts.
Figure 2:
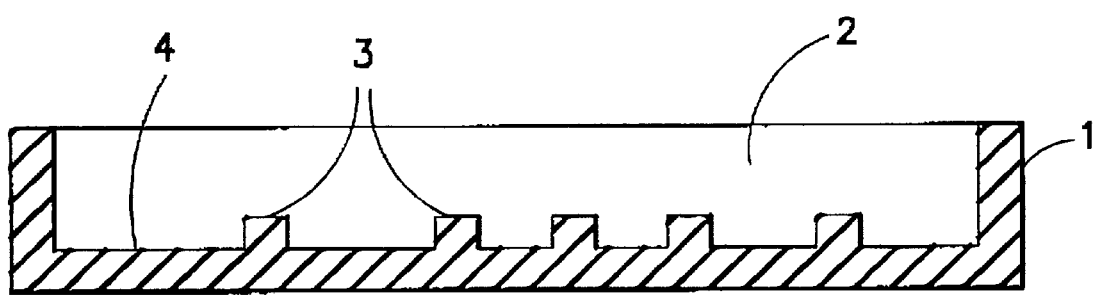
FIG. 2 is a cross-sectional view of the mold as shown in FIG. 1.
Figure 3:
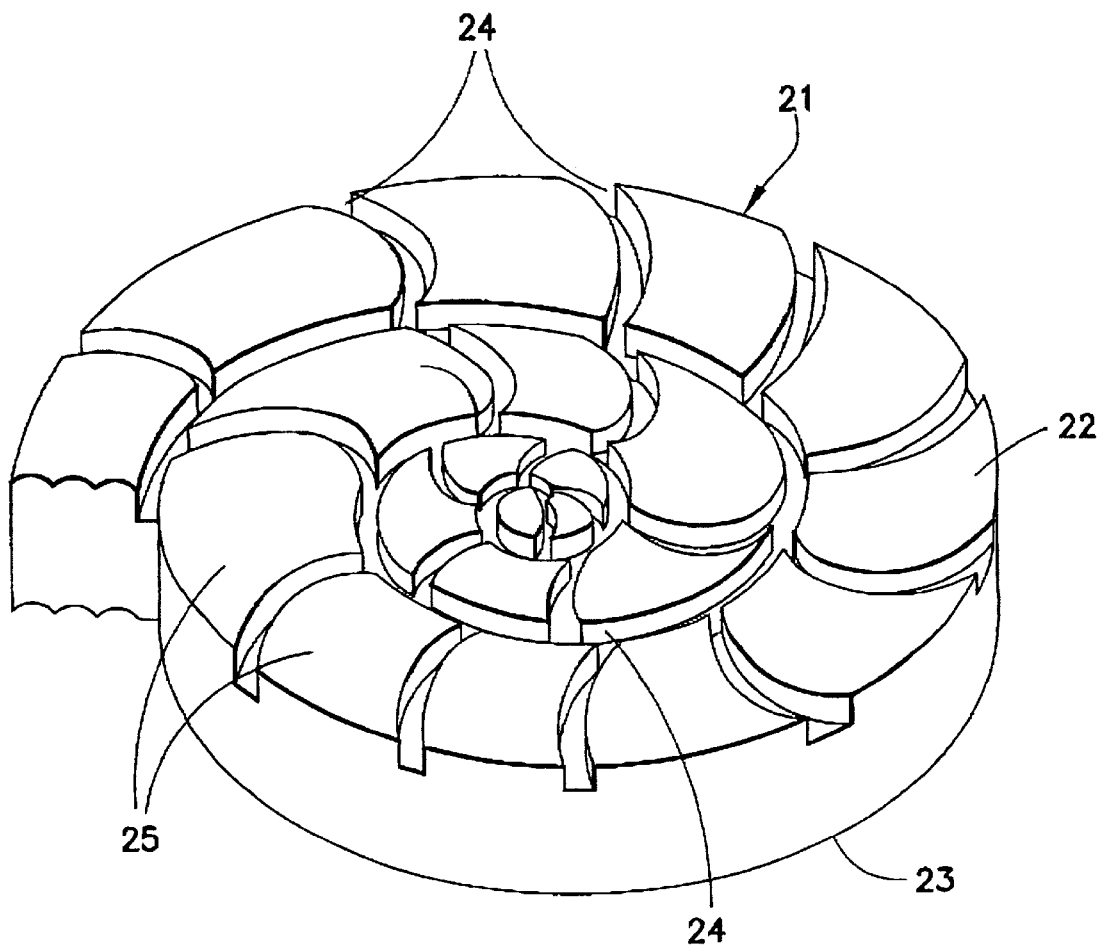
FIG. 3 is a perspective view of a pre-made insert which will constitute an inlay in the finished floor.

A preferred embodiment of the present invention includes the following steps:

(a) Preparing a mold for making epoxy inserts: An insert mold 1, as shown in FIG. 1 and FIG. 2, can be made of any suitable material that provides easy separation of the mold from the cured insert. The mold is preferably made of silicone rubber, although other soft rubber may be advantageously used. Indeed any readily deformable material that does not adhere to the material of the insert will be satisfactory. The mold has a cavity 2 that receives the material, preferably to fill the cavity. The mold cavity is preferably designed to have one or more of ridges 3 projecting from the cavity's bottom surface 4 into the cavity. Those ridges will generate complementary grooves 24 on the upper surface of the molded insert as shown in FIG. 3. The particular shape and design of the mold forms no part of the invention, and any shape and design may be employed without departing from the invention.

Figure 4:
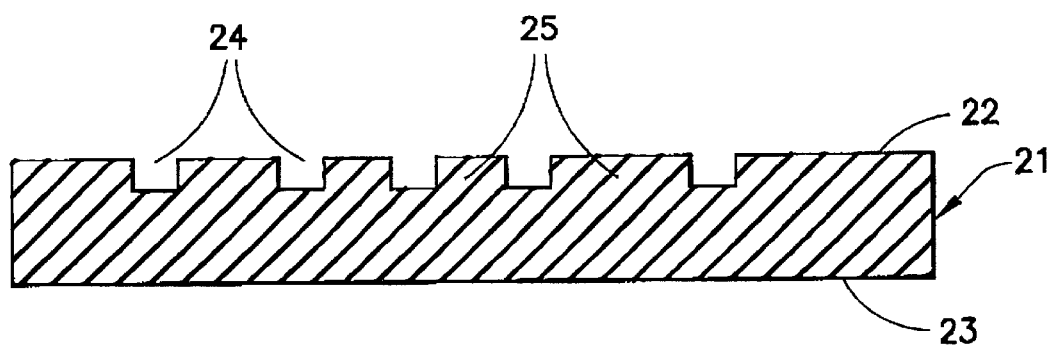
FIG. 4 is a cross-sectional view of the insert as shown in FIG. 3.

(b) Preparing Inserts: Inserts can be made of any material suitable for flooring, but are preferably made of the same material as the overall floor will be cast from, more preferably a resinous material and most preferably an epoxy-based mixture containing visual ingredients such as pigments for coloring, colored marble pieces, plastic chips and/or glass fragments, the amount and style of which can be predetermined to produce a desired visual effect. In general, inserts have the same epoxy formulation as the base materials that makes up the overall floor so that bonds are more readily formed between the inserts and overall floor. However, inserts may have a different visual ingredients so that the inserts and the overall floor show contrasting appearances, such as, for example, contrasting colors or inclusions. By means of the design of the molding cavity in the mold, see step (a), inserts can have any physical dimensions suitable for being embedded as inlays. In general, an insert 21, as shown in FIG. 3 and FIG. 4, preferably has two parallel surfaces, an upper surface 22 and a lower surface 23. The lower surface is preferably flat without recesses to enhance adhesion to the sub-flooring. The upper surface, on the other hand, may and preferably does contain one or more grooves 24 molded into the upper surface so that the non-grooved portions 25 of the upper surface define the a predetermined pattern or design which is outlined by the grooves. In the embodiment shown in FIG. 3, the design outlined is an artistic representation of a snail shell. For a given floor, one insert or a plurality of inserts of same or different designs, i.e., inserts showing different artwork, may be used. An insert generally has a thickness, i.e., the distance between the upper and the lower surfaces, that is slightly greater than the thickness of the finished floor. By way of example only and not by way of limitation, in one embodiment, the insert has a thickness of 0.62 inch and a diameter of 11 inches. The grooves have a depth of 0.23 inch. While the forming of the inserts by molding is preferred, the inserts may also be fabricated by machining or other known industrial forming techniques.

Figure 5:
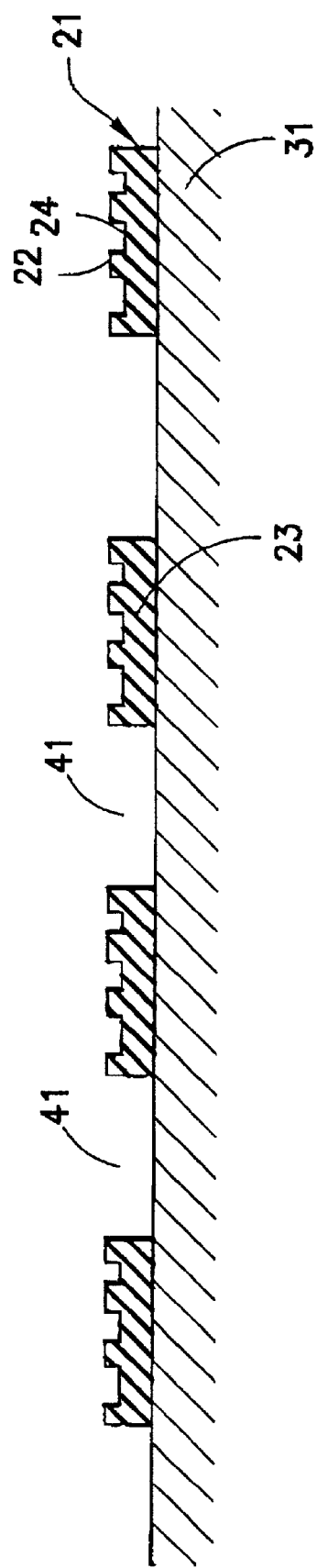
FIG. 5 depicts a sectional view of a floor prior to be poured but with a number of inserts placed and affixed on the floor substrate.

(c) Placing and affixing inserts: When inserts made in step (b) are cured and hardened, they are removed from the mold and placed on the sub-flooring 31 in a predetermined arrangement, properly leveled out and affixed on the sub-flooring with suitable adhesive, such as for example epoxy, see FIG. 5. Of course, other adhesives can be employed.

Figure 6:
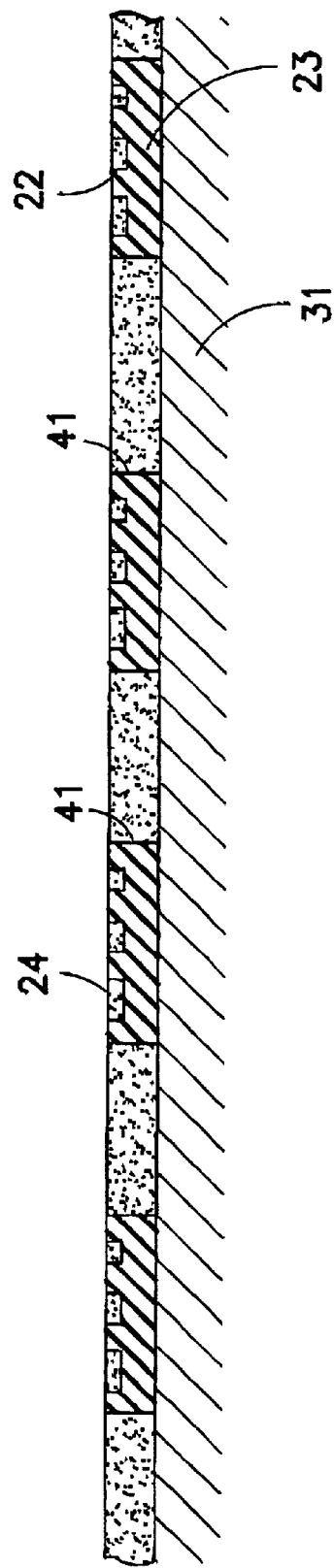
FIG. 6 depicts a cross-sectional view of the same floor of FIG. 3 but immediately following the overall floor is poured.

(d) Preparing the overall floor: The overall floor can be made of any material suitable for terrazzo flooring that can bond to the inserts, preferably a mixture having the same epoxy formulation as the inserts made in step (b). To give the desired contrasting appearance between the overall floor and the inserts so that design patterns become visible, indeed highlighted, inserts and overall floor may preferably have different visual ingredients as mentioned in step (b), such as different pigments, and/or different kinds or colors of chips and fragments, or both. After inserts are properly placed, leveled, and affixed on the sub-flooring, as described in step (c), the overall floor mixture, properly formulated and prepared by any conventional methods, is poured into the space 41 between the inserts until the fluid level reaches a height that results in the overall flooring material to fill up the molded grooves 24 in the upper surfaces of the inserts and, preferably to reach a height that is slightly greater than the thickness of the inserts. A monolithic floor is thus formed, see FIG. 6. Although it is preferred, as the case in this embodiment, to fill up the grooves with the same overall flooring material during the pouring of the overall floor, the grooves may be filled up before or after the pouring and the filling material for the grooves may be other existing or future-developed materials which can bond to and integrated with the pre-made inserts, whether or not they are visually distinguishable from the inserts or the overall floor. The grooves may also be painted with a color or left unfilled. In such a case, that is, where no filling material is used, the top surface of the inserts may be protected with a cover such as, for example, a plastic sheet during the pouring of the overall floor. Or, the grooves can be temporarily filled with a removable material such as, for example, sands to preempt the entry of the overall flooring fluid into the grooves.

Figure 7:
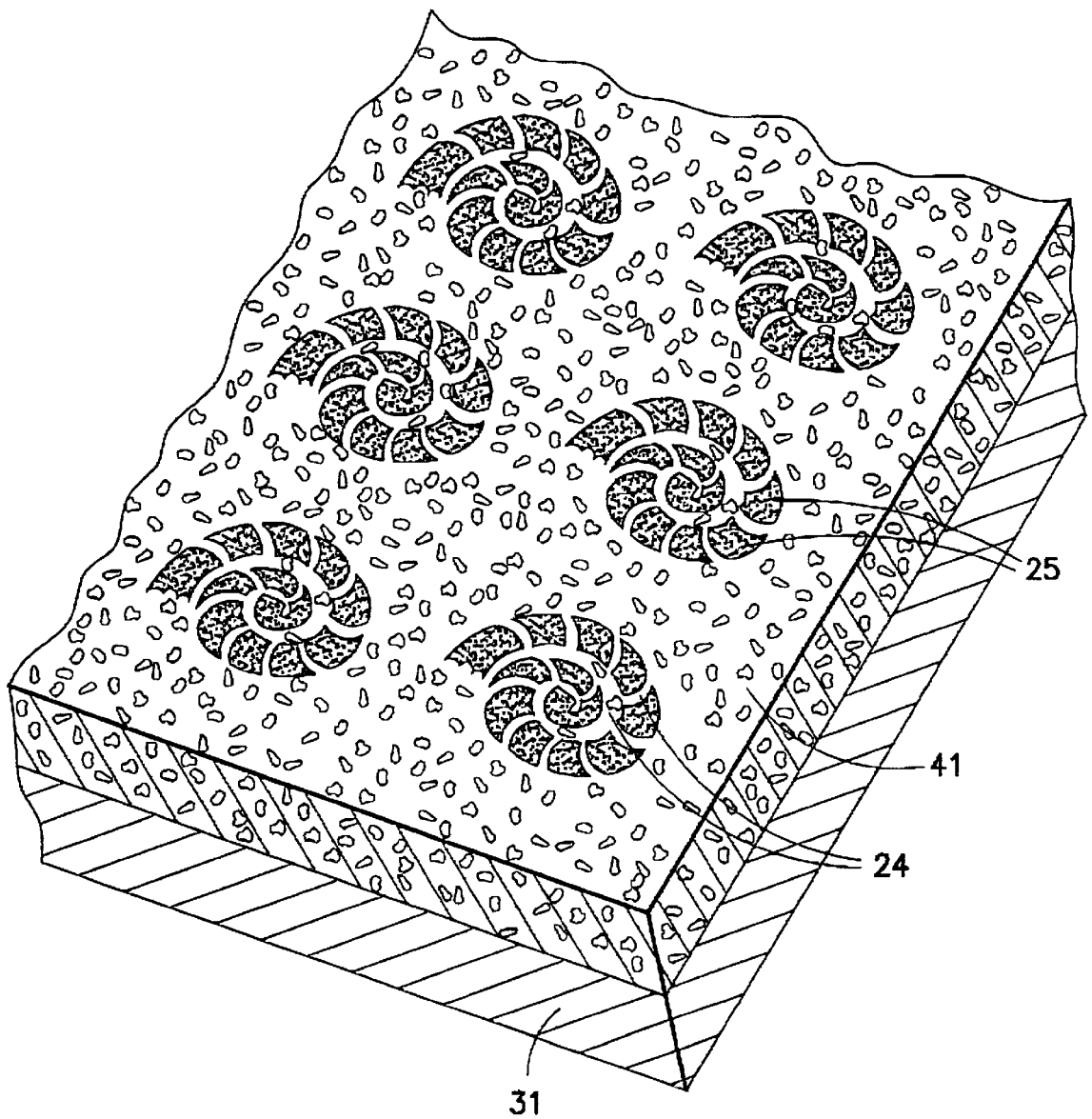
FIG. 7 depicts a portion of the finished floor after grinding and polishing.

(e) Final floor finishing: When the curing process of the monolithic floor made in step (d) is complete, the entire surface of the floor is polished at once as an integral floor until the top surfaces of the inserts are exposed and brought into planar alignment with the overall floor without significantly disturbing the filling material disposed in the insert grooves 24. In the finished floor, grooves 24, being filled with later applied overall flooring epoxy in this case, take the appearance of the overall floor in contrast to the appearance of the upper surface of the inserts to thus outline the design pattern in the upper surface of the inserts 22. In this embodiment, as shown in FIG. 7, the design inserts are perceived as inlays outlining snail shells. In the case where the inserts are designed not to have molded grooves, the inserts will be perceived as solid spots with predetermined design shapes.

While there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

The invention is not limited by the embodiments described above which are presented as examples only but can be modified in various ways within the scope of protection defined by the appended patent claims.

I claim:

1. A method of making a monolithic terrazzo floor having seamlessly integrated inlays with design patterns on a sub-flooring, comprising the steps of:

(a) forming one or more floor inserts, each floor insert having a top surface with at least one groove therein defining a design element corresponding to one of said seamlessly integrated inlays and a bottom surface operatively engageable with said sub-flooring;

(b) placing said insert or inserts on said sub-flooring to cover a portion of said sub-flooring such that said bottom surface engages with said sub-flooring;

(c) pouring unset terrazzo to cover the portion of said sub-flooring not covered by said insert or inserts with said unset terrazzo and to also fill said at least one groove of said insert or inserts with said unset terrazzo at least up to said top surface of said insert or inserts; and (d) permitting said unset terrazzo to set to thereby form said monolithic terrazzo floor;

wherein said top surface of said insert or inserts is exposed in a finished surface of said monolithic terrazzo floor.

2. The method of claim 1, wherein said terrazzo covering said sub-flooring is visually indistinguishable from said terrazzo in said at least one groove.

3. The method of claim 1, wherein a plurality of inserts having identical grooved design elements corresponding to identical seamlessly integrated inlays are used.

4. The method of claim 1, wherein said insert or inserts are made of an epoxy-based terrazzo material.

5. The method of claim 1, wherein said grooved insert or inserts are made of terrazzo having the same formulation as said terrazzo poured in step (c) except that said terrazzo of which said grooved insert or inserts are made contains different visual ingredients than said terrazzo poured in step (c).

6. The method of claim 1, wherein a plurality of inserts having at least two different grooved design elements corresponding to different seamlessly integrated inlays are used.

7. The method of claim 6, wherein said grooved insert or inserts and said terrazzo poured in step (c) are both made of an epoxy-based terrazzo material.

* * * * *